US012188489B1

(12) United States Patent
Ni et al.

(10) Patent No.: US 12,188,489 B1
(45) Date of Patent: Jan. 7, 2025

(54) GUIDE VANE BODY WITH VORTEX SUPPRESSION STRUCTURE RING AND AXIAL-FLOW NUCLEAR REACTOR COOLANT PUMP

(71) Applicant: Jiangsu University, Zhenjiang (CN)

(72) Inventors: Dan Ni, Zhenjiang (CN); Bo Gao, Zhenjiang (CN); Shiyuan Huang, Zhenjiang (CN); Zhong Li, Zhenjiang (CN); Yanna Sun, Zhenjiang (CN)

(73) Assignee: Jiangsu University, Zhenjiang (CN)

( * ) Notice: Subject to any disclaimer, the term of this patent is extended or adjusted under 35 U.S.C. 154(b) by 0 days.

(21) Appl. No.: 18/770,927

(22) Filed: Jul. 12, 2024

(30) Foreign Application Priority Data

Aug. 28, 2023 (CN) ......................... 202311086694.0

(51) Int. Cl.
*F04D 29/66* (2006.01)
*G21C 15/243* (2006.01)

(52) U.S. Cl.
CPC ......... *F04D 29/669* (2013.01); *G21C 15/243* (2013.01)

(58) Field of Classification Search
CPC ........ F04D 7/08; F04D 29/545; F04D 29/547; F04D 29/548; F04D 29/661; F04D 29/669; G21C 15/243
See application file for complete search history.

(56) References Cited

U.S. PATENT DOCUMENTS

| | | | | |
|---|---|---|---|---|
| 3,859,008 A * | 1/1975 | Wieser | F04D 7/08 976/DIG. 200 |
| 8,951,005 B2 * | 2/2015 | Smeulers | F16L 55/02727 415/206 |
| 2010/0077768 A1 | 4/2010 | Leblanc | |

FOREIGN PATENT DOCUMENTS

| | | |
|---|---|---|
| CN | 101418803 A | 4/2009 |
| CN | 102777423 A | 11/2012 |
| CN | 204239317 U | 4/2015 |
| CN | 105275880 A | 1/2016 |
| CN | 107120314 A | 9/2017 |
| CN | 206957988 U | 2/2018 |
| CN | 108457907 | 9/2019 |

(Continued)

OTHER PUBLICATIONS

Machine translation of CN-115163542-A (Year: 2022).*

(Continued)

*Primary Examiner* — David E Sosnowski
*Assistant Examiner* — Jason G Davis
(74) *Attorney, Agent, or Firm* — Pilloff Passino & Cosenza LLP; Rachel Pilloff; Sean Passino

(57) ABSTRACT

Provided are a guide vane body with a vortex suppression structure ring and an axial-flow nuclear reactor coolant pump (RCP), including a rim cover plate, a hub cover plate, guide vane blades and a diffuser, where the hub cover plate is coaxially arranged in the rim cover plate, and a flow channel is placed between the hub cover plate and the rim cover plate, and a plurality of guide vane blades are placed (Continued)

in the flow channel in an array; and an outlet end of the hub cover plate is connected with the diffuser, and an outer wall of the diffuser gradually expands along a fluid flow direction; a diversion ring is arranged circumferentially on an inner wall at the outlet side of the rim cover plate, and the vortex suppression structure ring is placed at an outlet edge of the diversion ring.

6 Claims, 5 Drawing Sheets

(56) References Cited

FOREIGN PATENT DOCUMENTS

| | | | | |
|---|---|---|---|---|
| CN | 115163542 A | * 10/2022 | ........... | F04D 29/026 |
| CN | 111720364 | 5/2024 | | |

OTHER PUBLICATIONS

Search report dated Mar. 28, 2024 from SIPO in application 202311086694.0.
Search report dated Apr. 3, 2024 from SIPO in application 202311086694.0.

* cited by examiner

GUIDE VANE BODY WITH VORTEX SUPPRESSION STRUCTURE RING AND AXIAL-FLOW NUCLEAR REACTOR COOLANT PUMP

CROSS-REFERENCE TO RELATED APPLICATIONS

This application claims priority to Chinese Patent Application No. 202311086694.0, filed on Aug. 28, 2023, the contents of which are hereby incorporated by reference.

TECHNICAL FIELD

The disclosure relates to the structural design of a guide vane body of an axial-flow nuclear reactor coolant pump (RCP), belonging to the field of fluid machinery, in particular to a guide vane body with a vortex suppression structure ring and an axial-flow RCP.

BACKGROUND

In the context of the 'carbon peaking and carbon neutrality goals', the development of nuclear power is a crucial strategic step towards achieving these objectives. The RCP, as a vital component in the primary circuit of pressurized-water reactor (PWR) nuclear power plants (NPPs), plays a significant role in this endeavor. Its safe, stable, and efficient long-term operation is paramount for the success of NPPs. Therefore, any improvements in the RCP's hydraulic performance, such as those proposed in this research, are of utmost importance.

Compared with traditional pumps, the RCP has an unconventional quasi-spherical pumping chamber with complex flow structures such as secondary flow, recirculation, and flow separation. These complicated flow structures will generate complicated excitation forces and cause strong pressure pulsation, thereby affecting the hydraulic performance and operation stability of the pump. Therefore, it is essential to grasp the internal unsteady flow characteristics and eliminate the influence of complex flow structures on the RCP. As an important hydraulic component in the RCP, the guide vane plays a role in eliminating the circulation of liquid in the axial-flow pumps, and transforming velocity energy into pressure energy, which is one of the factors affecting the hydraulic performance of the RCP. The design of the guide vane structure may be considered to improve the flow structure in the pump and improve the hydraulic performance and operational stability of the pump.

At present, the means to improve the hydraulic performance of RCP by changing the guide vane structure are mainly aimed at mixed-flow RCP, and most of the means start with changing the shape and arrangement of guide vane blades. For example, "Guide vane structure of nuclear main pump with wavy bionic structure and design method" (Patent number: 202010667107.7) discloses a guide vane structure of the RCP using wavy bionic blades to improve the flow situation in the guide vanes of the RCP and achieve the objective of improving the head and efficiency of the RCP. "Symmetrical non-uniform distribution guide vane structure and guide vane design method for nuclear main pump" (Patent number: 201810262382.3) proposes a new guide vane structure with non-uniform distribution of guide vane blades to adjust the flow area of guide vanes, so as to reduce the flow loss and improve the hydraulic performance.

At present, no patent disclosure exists on the design of the guide vane body of the axial-flow RCP.

SUMMARY

The objective of the disclosure is to provide a guide vane body with a vortex suppression structure ring and an axial-flow RCP. By optimizing the structure of the guide vane body, the vortex structure at the outlet of the guide vane is eliminated, the vorticity inside the pump is reduced, the flow structure inside the pump is improved, and the hydraulic performance of the RCP, including head, efficiency, and operational stability, is enhanced.

The technical route adopted in the disclosure is as follows.

A guide vane body with a vortex suppression structure ring includes a rim cover plate, a hub cover plate, guide vane blades and a diffuser, where the hub cover plate is coaxially arranged in the rim cover plate, and a flow channel is placed between the hub cover plate and the rim cover plate, and a plurality of guide vane blades are placed in the flow channel in an array; and an outlet end of the hub cover plate is connected with the diffuser, and an outer wall of the diffuser gradually expanding along a fluid flow direction;

a diversion ring is arranged circumferentially on an inner wall at an outlet side of the rim cover plate, and a vortex suppression structure ring is placed at an outlet edge of the diversion ring.

Further, an inlet of the vortex suppression structure ring is flush with an outlet of the diversion ring, and extends along the fluid flow direction, and n layers of serration rings are coaxially arranged on an end surface of the vortex suppression structure ring at the outlet.

Further, a cross-section of the serration rings on the vortex suppression structure ring is an equilateral triangle.

Further, a length of a serration side of the serration rings is x, and a range of x is $(\frac{1}{8}-\frac{1}{5})B$, where B is a thickness of the diversion ring outlet.

Further, a height of the vortex suppression structure ring is H, and the thickness of diversion ring outlet is B, and a relationship between H and B is H=(1-1.5)B.

Further, a thickness of the vortex suppression structure ring is nx, and a number n of layers of serration rings ranges from 3 to 5.

Further, the guide vane blades are equipped with 14 pieces.

Further, an inner wall of the rim cover plate gradually expands along the direction of fluid flow.

Further, the hub cover plate is smoothly connected with an outer wall surface of the diffuser.

An axial-flow RCP includes the guide vane body with the vortex suppression structure ring described above.

The disclosure has the following beneficial effects.

The guide vane body with the vortex suppression structure ring described in this disclosure breaks the vortex shedding structure at the outlet of the guide vane by adding a stepped zigzag vortex suppression structure ring, quickly dissipates its energy, making the fluid flow more uniform, reduces the flow loss, and achieving the effect of increasing the head and efficiency of the axial-flow RCP. While ensuring the overall hydraulic performance of the pump, the guide vane body improves the flow state inside the pump, suppresses the generation of vortex structure inside the pump, reduces the vortex inside the RCP, reduces the pressure pulsation in the spherical pressure chamber, and improves the operation stability of the pump.

DETAILED DESCRIPTION OF THE EMBODIMENTS

In order to make the purpose, technical scheme and advantages of the disclosure clearer, the disclosure will be further described in detail with attached drawings and embodiments. It should be understood that specific embodiments described here are only for explaining the disclosure and not are used to limit the disclosure. The disclosure will be further described in detail with reference to the attached drawings.

Figure 1:
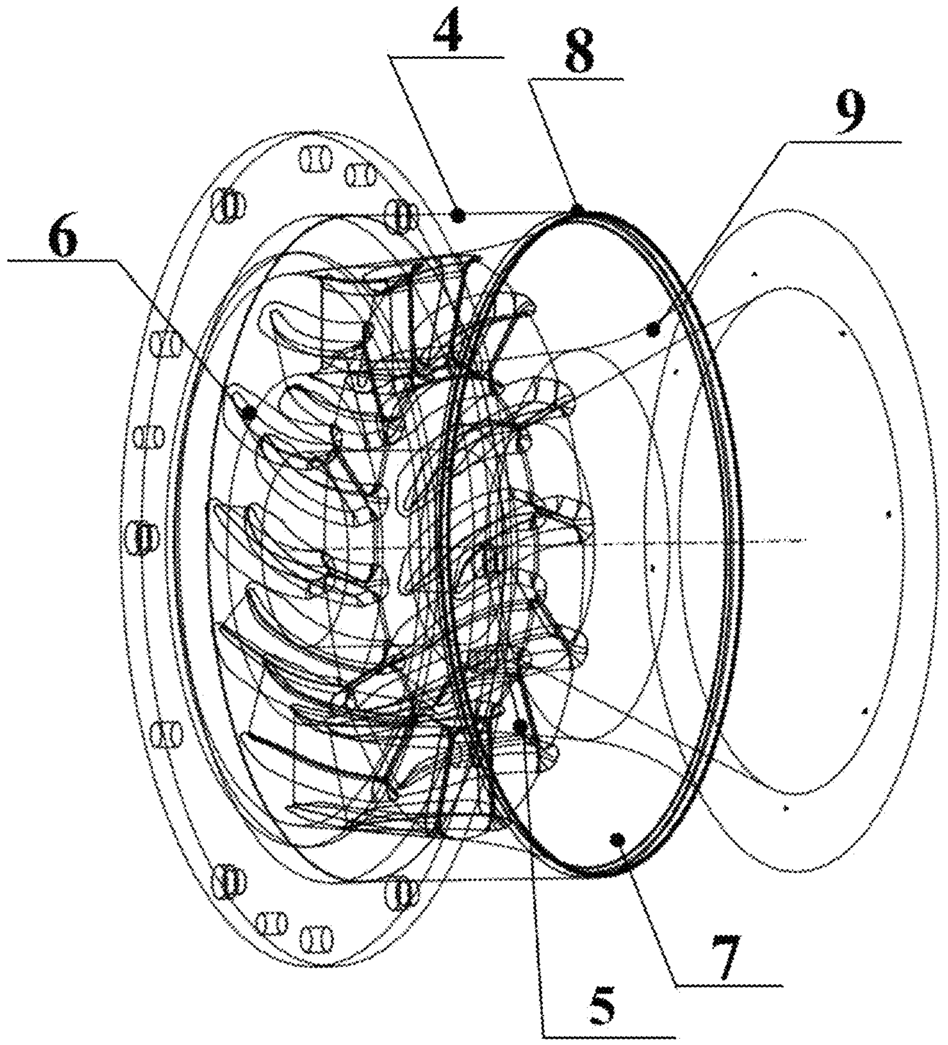
FIG. 1 is a schematic view of the guide vane body with the vortex suppression structure ring according to the disclosure.
Figure 2:
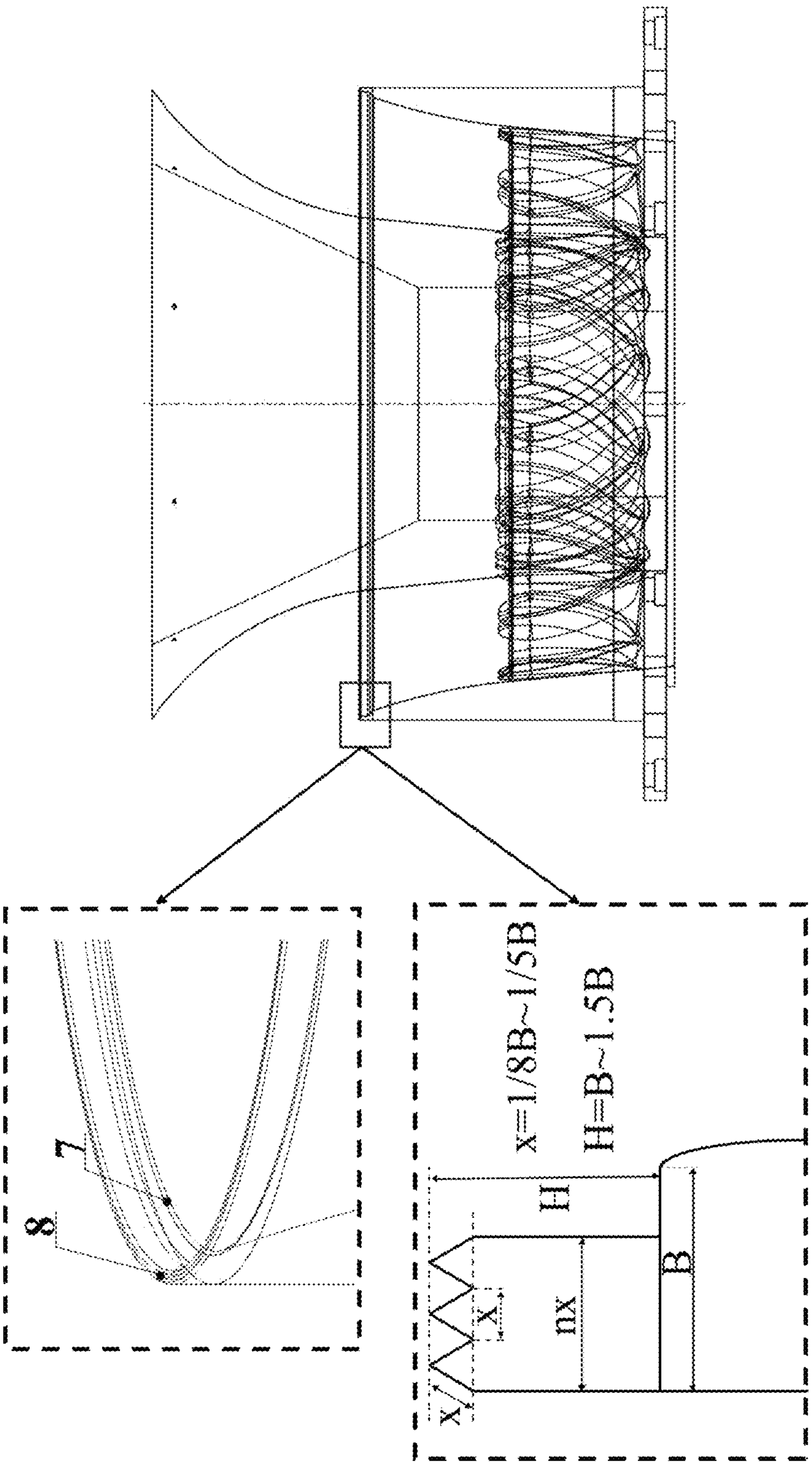
FIG. 2 is a concrete schematic diagram of the guide vane body with the vortex suppression structure ring according to the disclosure.
Figure 3:
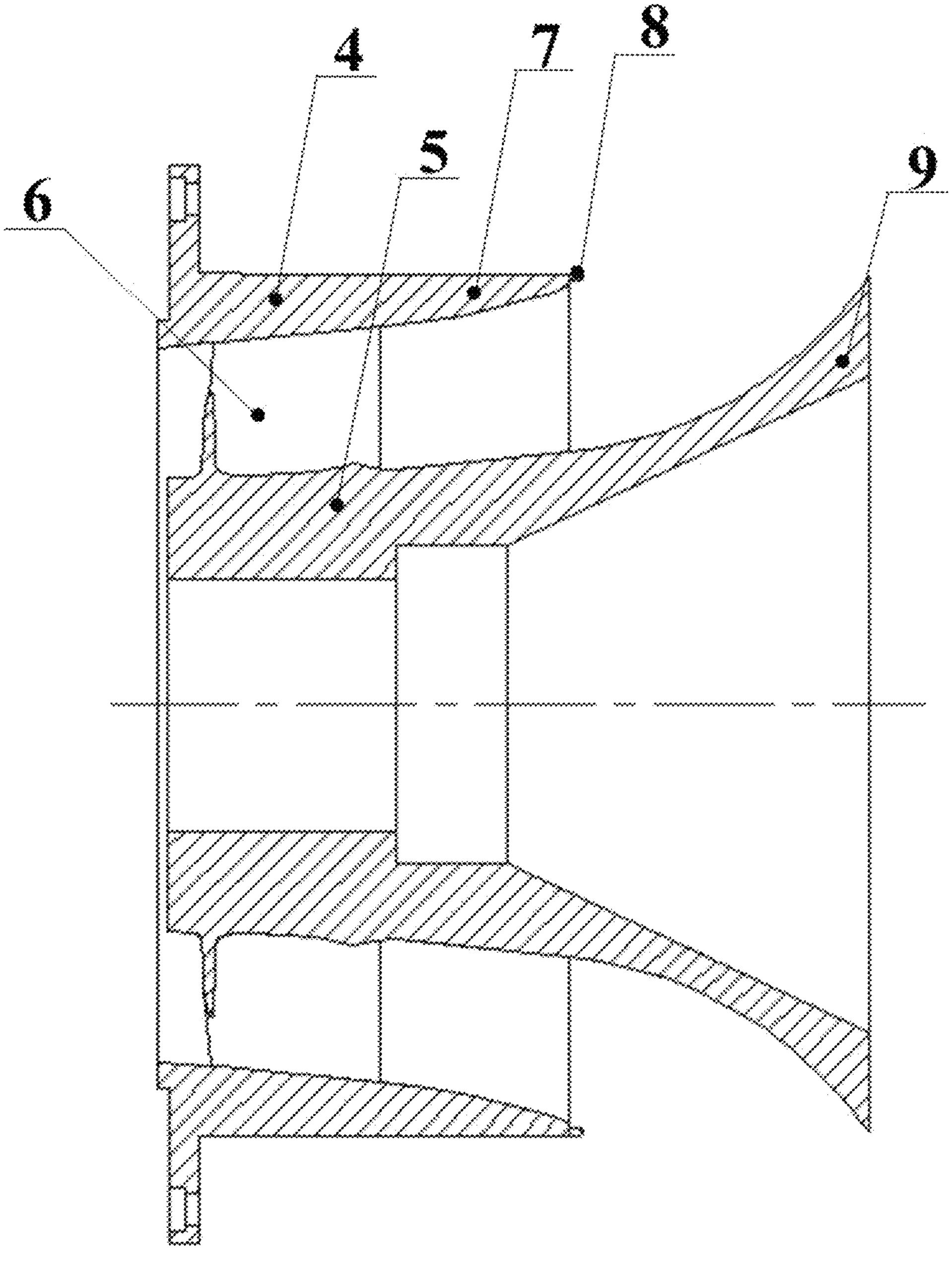
FIG. 3 is a sectional view of the guide vane body with the vortex suppression structure ring according to the disclosure.
Figure 4:
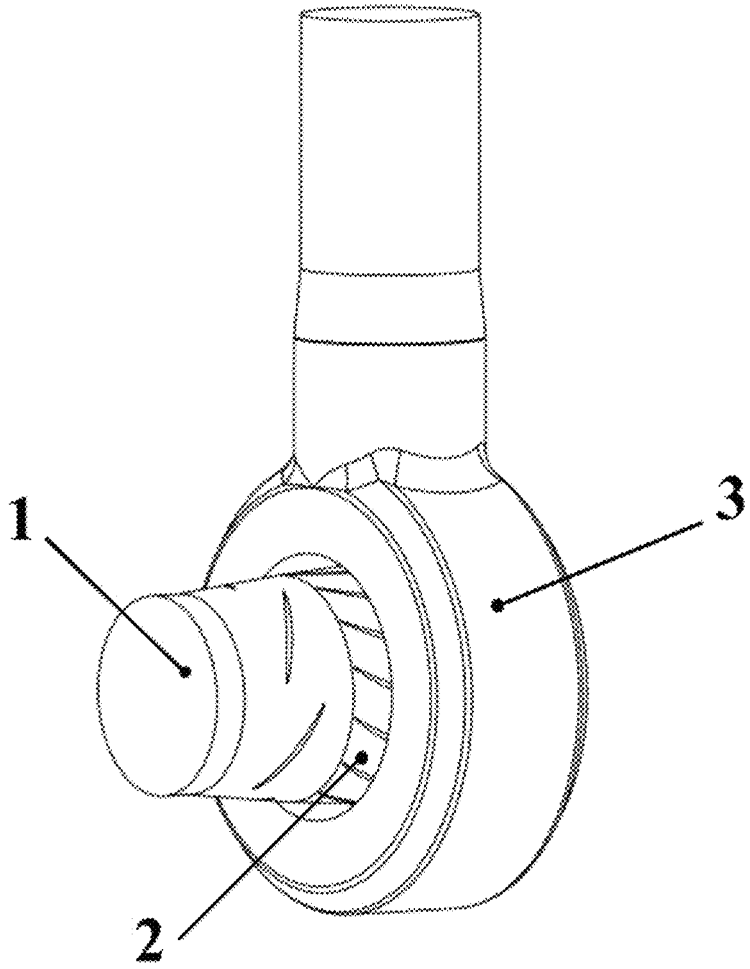
FIG. 4 is a schematic diagram of the axial-flow RCP according to the disclosure.
Figure 5:
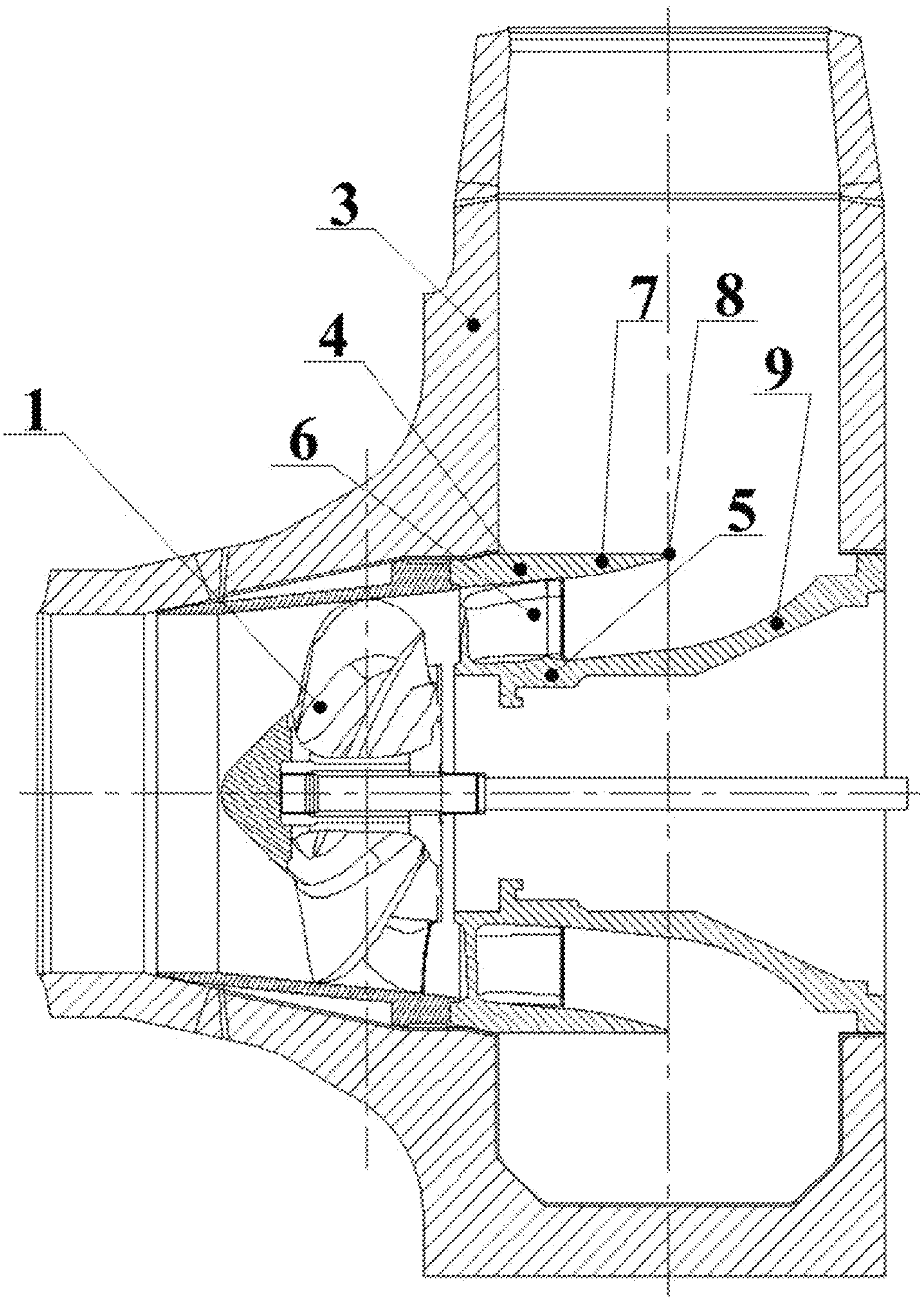
FIG. 5 is an axial view of the axial-flow RCP according to the disclosure.

With reference to FIG. 1-FIG. 5, the disclosure discloses a guide vane body with a vortex suppression structure ring, where the guide vane body 2 includes a rim cover plate 4, a hub cover plate 5, guide vane blades 6 and a diffuser 9. Structures and connection relationships of each component are as follows.

An inlet end of the rim cover plate 4 is provided with a flange for connecting and fixing with the pump body; the whole rim cover plate 4 is cylindrical, and an inner wall of the rim cover plate 4 gradually expands along a fluid flow direction. A diversion ring 7 is arranged on an inner wall at an outlet side of the rim cover plate 4 in a circumferential direction, and a vortex suppression structure ring 8 is arranged on an end surface at an outlet side of the diversion ring 7. An inlet of the vortex suppression structure ring 8 is flush with an outlet of the diversion ring 7. The vortex suppression structure ring 8 extends along the fluid flow direction, and from an outer diameter to an inner diameter direction of the diversion ring 7, and there are n serrations distributed, and the n serrations are arranged in sequence. A section of each of the serration rings on the vortex suppression structure ring 8 is an equilateral triangle. A length of each of the serrations is x, and a value range of x is (⅛-⅕)B, where B is an outlet thickness of the diversion ring 7. A height of the vortex suppression structure ring 8 is H, and the outlet thickness of diversion ring 7 is B, and a relationship between H and B is H=(1-1.5)B. A thickness of the vortex suppression structure ring 8 is nx, and a number n of layers of the serration rings is in the ranges of 3 to 5.

The hub cover plate 5 is coaxially arranged in the rim cover plate 4, an outer wall of the hub cover plate 5 is smooth and cylindrical, and an outlet end of the hub cover plate 5 is connected with the diffuser 9, and an outer wall of the diffuser 9 is gradually expanding along the fluid flow direction; the hub cover plate 5 is smoothly connected with an outer wall surface connected to the diffuser 9; thus, a smooth gradually expanding flow channel is formed between the rim cover plate 4, the hub cover plate 5 and the connecting diffuser 9.

The plurality of guide vane blades 6 are arranged in an array between the hub cover plate 5 and the rim cover plate 4.

Based on the design of the guide vane body, the disclosure also proposes an axial-flow RCP. The RCP includes an axial-flow impeller 1, a guide vane body 2 and a quasi-spherical pumping chamber 3, where the guide vane body 2 is a rear guide vane and is located at an outlet edge of the impeller 1, and an outlet edge of the diversion ring 7 is aligned with a center of the quasi-spherical pumping chamber 3 during assembly.

In this embodiment, a material of the vortex suppression ring 8 needs to be consistent with a material of the guide vane body 2, which is typically made of 304 stainless steel.

A specific implementation example is provided below. In this scheme, there are 14 guide vane blades evenly distributed clockwise and made of 304 stainless steel. The thickness of the diversion ring is 5 millimeters (mm), and the zigzag side length x of the vortex suppression structure ring is 1 mm and a total of 5 serrations arranged in an interleaved manner. The thickness of the vortex suppression structure ring is 5 mm and the height H is 5 mm.

The guide vane body with the vortex suppression structure ring and the axial-flow RCP according to the disclosure may effectively suppress the generation of vortex in the guide vanes, reduce vorticity and improve the flow state in the pump, thereby achieving the purposes of improving hydraulic performance and operating stability.

Although embodiments of the disclosure have been shown and described, it will be understood by those skilled in the art that various changes, modifications, substitutions and variations may be made to these embodiments without departing from the principles and spirit of the disclosure. The scope of the disclosure and accompanying claims and their equivalents are limited.

What is claimed is:

1. A guide vane body with a vortex suppression structure ring, comprising a rim cover plate, a hub cover plate, guide vane blades and a diffuser, wherein the hub cover plate is coaxially arranged in the rim cover plate, and a flow channel is placed between the hub cover plate and the rim cover plate, and the guide vane blades are placed in the flow channel in an array; and an outlet end of the hub cover plate is connected with the diffuser, and an outer wall of the diffuser is gradually expanding along a fluid flow direction;

a diversion ring is arranged circumferentially on an inner wall at an outlet side of the rim cover plate, and the vortex suppression structure ring is placed at an end surface of the diversion ring at an outlet side;

an inlet of the vortex suppression structure ring is flush with an outlet of the diversion ring, and extends along the fluid flow direction, and n layers of serration rings are coaxially arranged on an end surface of the vortex suppression structure ring at an outlet side;

a cross-section of the serration rings on the vortex suppression structure ring is an equilateral triangle;

a length of a serration side of the serration rings is x, and a value range of x is (⅛-⅕)B, wherein B is a thickness of the outlet side of the diversion ring;

a height of the vortex suppression structure ring is H, and the thickness of the outlet side of the diversion ring is B, and a relationship is H=(1-1.5)B.

2. The guide vane body with the vortex suppression structure ring according to claim 1, wherein a thickness of the vortex suppression structure ring is nx, and a number n of layers of serration rings ranges from 3 to 5.

3. The guide vane body with the vortex suppression structure ring according to claim 1, wherein there are 14 guide vane blades.

4. The guide vane body with the vortex suppression structure ring according to claim 1, wherein the inner wall of the rim cover plate gradually expands along a direction of fluid flow.

5. The guide vane body with the vortex suppression structure ring according to claim 1, wherein the hub cover plate is smoothly connected with an outer wall surface of the diffuser.

6. An axial-flow nuclear reactor coolant pump, being equipped with the guide vane body with the vortex suppression structure ring according to claim 1.

* * * * *